(12) United States Patent
Ohkubo et al.

(10) Patent No.: US 7,572,553 B2
(45) Date of Patent: Aug. 11, 2009

(54) HIGH DENSITY ELECTRODE AND BATTERY USING THE ELECTRODE

(75) Inventors: Takashi Ohkubo, Chiba (JP); Akinori Sudoh, Nagano (JP); Masataka Takeuchi, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 335 days.

(21) Appl. No.: 10/565,627

(22) PCT Filed: Jul. 27, 2004

(86) PCT No.: PCT/JP2004/011007

§ 371 (c)(1),
(2), (4) Date: Jan. 24, 2006

(87) PCT Pub. No.: WO2005/011027

PCT Pub. Date: Feb. 3, 2005

(65) Prior Publication Data

US 2007/0111101 A1    May 17, 2007

Related U.S. Application Data

(60) Provisional application No. 60/493,058, filed on Aug. 7, 2003, provisional application No. 60/567,010, filed on May 3, 2004.

(30) Foreign Application Priority Data

Jul. 28, 2003 (JP) ............................. 2003-280904
Apr. 27, 2004 (JP) ............................. 2004-131813

(51) Int. Cl.
H01M 4/58    (2006.01)
H01B 1/24    (2006.01)

(52) U.S. Cl. ............... 429/231.8; 429/232; 252/182.1; 252/511

(58) Field of Classification Search .............. 429/221, 429/223, 224, 231.1, 231.2, 231.3, 231.5, 429/231.4, 231.8, 232; 252/182.1, 511
See application file for complete search history.

(56) References Cited

U.S. PATENT DOCUMENTS

| | | | |
|---|---|---|---|
| 5,437,943 A | 8/1995 | Fujii et al. | |
| 5,541,022 A * | 7/1996 | Mizumoto et al. | 429/232 X |
| 6,085,015 A * | 7/2000 | Armand et al. | 429/221 X |
| 6,190,805 B1 | 2/2001 | Takeuchi et al. | |
| 6,194,099 B1 | 2/2001 | Gernov et al. | |
| 6,534,218 B1 * | 3/2003 | Okada et al. | 429/232 |
| 2003/0049443 A1 * | 3/2003 | Nishimura et al. | 428/364 |
| 2004/0043293 A1 | 3/2004 | Nagata et al. | |
| 2006/0035149 A1 * | 2/2006 | Nanba et al. | 429/232 X |

FOREIGN PATENT DOCUMENTS

| | | |
|---|---|---|
| CN | 1343269 | 4/2002 |
| EP | 0 858 119 A2 | 8/1998 |
| EP | 1 191 131 A1 | 3/2002 |
| EP | 1 265 301 A | 12/2002 |
| JP | 4-155776 A | 5/1992 |
| JP | 4-237971 A | 8/1992 |
| JP | 8-136439 A | 5/1996 |
| JP | 11-147989 A | 6/1999 |
| JP | 11-149824 A | 6/1999 |

OTHER PUBLICATIONS

Christine A. Frysz, et al, "Carbon Filaments and Carbon Black as a Conductive Additive to the Manganese Dioxide Cathode of a Lithium Electrolytic Cell", Journal of Power Sources, vol. 58, 1996 pp. 41-54.

* cited by examiner

*Primary Examiner*—Stephen J. Kalafut
(74) *Attorney, Agent, or Firm*—Sughrue Mion, PLLC

(57) ABSTRACT

The invention relates to a high-density electrode, obtained by impregnating a high-density electrode which comprises an electrode active substance and carbon fiber having a fiber filament diameter of 1 to 1,000 nm and has a porosity of 25% or less, with a solid polymer electrolyte; and to a battery including the resultant (high-density) electrode. According to the invention, electrolytic solution permeability and electrolytic solution retainability, which are matters of importance in realizing a high-density electrode for achieving a battery having a high energy density, can be improved.

19 Claims, No Drawings

HIGH DENSITY ELECTRODE AND BATTERY USING THE ELECTRODE

CROSS-REFERENCE TO RELATED APPLICATIONS

This is an application filed pursuant to 35 U.S.C. Section 111(a) with claiming the benefit of U.S. provisional application Ser. No. 60/493,058 filed Aug. 7, 2003 and U.S. provisional application Ser. No. 60/567,010 filed May 3, 2004 under the provision of 35 U.S.C. 111(b), pursuant to 35 U.S.C. Section 119(e) (1).

TECHNICAL FIELD

The present invention relates to a high-density electrode which is employed in a battery having high electrode bulk density and high charging/discharging capacity per volume, and exhibiting excellent charging/discharging cycle characteristics, excellent characteristics under a load of large current, and excellent electrolytic solution permeability; and to a battery including the resultant (high-density) electrode. More particularly, the present invention relates to a high-density electrode which is employed in a non-aqueous secondary battery, and to a non-aqueous secondary battery including the high-density electrode.

BACKGROUND ART

In accordance with development of portable apparatuses having smaller size, lighter weight, and higher performance, increasing demand has arisen for a secondary battery having high energy density and a secondary battery of high capacity. In view of such tendency, most small-sized portable apparatuses, such as cellular phones and video cameras, have been employing a lithium ion battery using a non-aqueous electrolytic solution, or a non-aqueous lithium secondary battery such as a lithium polymer battery, both of which exhibit high energy density and high voltage. Such a lithium secondary battery employs, as a positive electrode material, a metal oxide, such as lithium cobaltate, which has high charging/discharging capacity per unit weight at high electric potential, and, as a negative electrode material, a carbon material, such as graphite, which exhibits high charging/discharging capacity per unit weight at a low electric potential nearly equal to that of Li. However, a gravimetric charging/discharging capacity of such an electrode material employed in the battery is consumed nearly equal to the theoretical value, and thus the gravimetric energy density of the battery is approaching its limit. Therefore, many attempts have been made to develop new positive electrode materials of high capacity, such as an iron olivine compound and a metal sulfide, and new negative electrode materials, such as a composite material formed of a carbon material, and tin oxide, silicon oxide, a Li alloy, or lithium nitride.

A secondary battery employed in a small-sized portable apparatus is required to have smaller size; i.e., not only high gravimetric energy density but also high volumetric energy density. Therefore, attempts have been made to increase the amount of an electrode material charged into a battery container by increasing the density of the electrode material, to thereby enhance the volumetric energy density of the resultant electrode and battery.

Graphite, which is most widely employed as a negative electrode material, has a true density of about 2.2 g/cm$^3$, but currently available electrodes incorporating graphite have a density of about 1.5 g/cm$^3$. When the density of the electrode employing graphite is increased to 1.7 g/cm$^3$ or higher, the volumetric energy density of the resultant battery can be enhanced. Therefore, attempts have been made to increase the density of the electrode employing graphite. Meanwhile, lithium cobaltate, which is widely employed as a positive electrode material, has a true density of about 5.1 g/cm$^3$, but currently available electrodes incorporating lithium cobaltate have a density of less than 3.3 g/cm$^3$. Therefore, attempts have been made to increase the density of the electrode employing lithium cobaltate to 3.5 g/cm$^3$ or higher.

However, as the density of an electrode is increased, the amount of pores contained in the electrode is reduced, leading to problems including shortage of the amount of an electrolytic solution which is present in the pores and plays an important role for electrode reaction and decrease in the permeation rate of the electrolytic solution throughout the electrode. As the amount of the electrolytic solution in the electrode is reduced, the rate of electrode reaction decreases, leading to problems such as lowering of energy density and high-speed charging/discharging performance, which further causes a problem that the cycling characteristics of the battery is lowered. Meanwhile, as permeability of the electrolytic solution is impaired, the time required for the production of a battery is lengthened, leading to an increase in production cost. Such problems become more pronounced in a case of a battery such as a lithium polymer battery, which employs a polymer compound as a part of the components or as whole component in the electrolytic solution.

DISCLOSURE OF THE INVENTION

An object of the present invention is to realize a high-density electrode required for attaining a battery of high energy density through improvement of electrolytic solution permeability and electrolytic solution retainability in electrode.

In order to solve the aforementioned problems involved in a high-density electrode, the present inventors have conducted extensive studies, and as a result have found that when a high-density electrode is produced by adding carbon fiber having a diameter of 1 to 1,000 nm to an electrode active substance, the resultant battery exhibits excellent characteristics; i.e., high energy density and good high-speed charging/discharging performance, while maintaining electrolytic solution permeability and electrolytic solution retainability. The present invention has been accomplished on the basis of this finding.

Conventionally, studies have been performed on a technique in which carbon fiber is added to an electrode material to thereby improve the load characteristics and cycle life of the resultant battery, and such a technique has been put into practical use. For example, JP-A-4-155776 and JP-A-4-237971 disclose a technique in which carbon fiber is added to a graphite negative electrode in an attempt to lower the resistance of the electrode for improvement of the load characteristics, or to enhance the strength and expansion/shrinkage resistance of the electrode for improvement of cycle life of the resultant battery (The term "JP-A" as used herein means an "unexamined published Japanese patent application").

As described above, addition of carbon fiber to electrodes for batteries has been carried out in order to reduce electrode resistance and to enhance electrode strength. Therefore, addition of carbon fiber has not been required when the electrode active substance itself is of high strength and has a high electrical conductivity or can obtain a high electrical conductivity and high strength by addition of carbon black or other carbon particles for enhancing electrical conductivity of the electrode active substance. In addition, since conventionally employed electrodes have a porosity of more than 25%; i.e., a relatively low density, electrolytic solution permeability of an electrode has been not a big issue. However, in the recent competition for improving energy density of an electrode, as more and more studies are being performed to produce an electrode having a higher volumetric energy density by improving electrode density, the issue of electrolytic solution permeability of an electrode is more and more critical.

The present invention is based on the findings that when carbon fiber is added to an electrode material, the electrolytic solution permeability of the resultant electrode for use in battery is improved, and in particular that even if the resultant electrode exhibits a porosity of 25% or less; i.e., high density, reduction in the electrolytic solution permeability of the electrode is not considerable, and the electrode exhibits low resistance and excellent strength as in the case of a conventional electrode.

The reason why the electrolytic solution permeability of a high-density electrode is improved through addition of carbon fiber is considered as follows: fine carbon fiber filaments are appropriately dispersed between highly compressed active substance particles, and thus micropores are maintained between the particles.

Accordingly, the present invention provides a high-density electrode and a battery including the electrode, as described below.

1. A high-density electrode, obtained by impregnating a high-density electrode which comprises an electrode active substance and carbon fiber having a fiber filament diameter of 1 to 1,000 nm and has a porosity of 25% or less, with a solid polymer electrolyte.
2. The high-density electrode according to 1 above, wherein the carbon fiber is graphite carbon fiber which has undergone thermal treatment at 2,000° C. or higher.
3. The high-density electrode according to 1 or 2 above, wherein the carbon fiber is graphite carbon fiber having a surface onto which an oxygen-containing functional group has been introduced through oxidation treatment.
4. The high-density electrode according to any one of 1 to 3 above, wherein the carbon fiber is graphite carbon fiber containing boron in an amount of 0.1 to 100,000 ppm.
5. The high-density electrode according to any one of 1 to 4 above, wherein the amount of the carbon fiber is 0.05 to 20 mass %.
6. The high-density electrode according to any one of 1 to 5 above, wherein the carbon fiber has an average aspect ratio of 5 to 50,000.
7. The high-density electrode according to any one of 2 to 4 above, wherein the graphite carbon fiber has, at a (002) plane, an average interlayer distance ($d_{002}$) of 0.344 nm or less as measured by means of X-ray diffractometry.
8. The high-density electrode according to any one of 1 to 7 above, wherein the carbon fiber has, in its interior, a hollow structure.
9. The high-density electrode according to any one of 1 to 8 above, wherein the carbon fiber contains branched carbon fiber.
10. The high-density electrode according to any one of 1 to 9 above, wherein the electrode active substance is a carbon material.
11. The high-density electrode according to 10 above, wherein the carbon material contains Si.
12. The high-density electrode according to 10 or 11 above, wherein the carbon material is a non-graphite carbon material, and the bulk density of the electrode is 1.5 g/cm³ or more.
13. The high-density electrode according to any one of 10 to 12 above, wherein, before being formed into an electrode, the carbon material serving as the electrode active substance is in the form of carbonaceous particles satisfying the following requirements:
(1) average roundness as measured by use of a flow particle image analyzer is 0.70 to 0.99; and
(2) average particle size as measured by means of laser diffractometry is 1 to 50 µm.
14. The high-density electrode according to 10, 11 or 13 above, wherein the carbon material contains a graphite material in an amount of 50 mass % or more, and the bulk density of the electrode is 1.7 g/cm³ or more.
15. The high-density electrode according to 14 above, wherein the graphite material contains boron.
16. The high-density electrode according to 14 or 15 above, wherein, before being formed into an electrode, the carbon material serving as the electrode active substance is in the form of carbon particles containing, in an amount of 50 mass % or more, graphite particles satisfying the following requirements:
(1) average roundness as measured by use of a flow particle image analyzer is 0.70 to 0.99; and
(2) average particle size as measured by means of laser diffractometry is 1 to 50 µm.
17. The high-density electrode according to any one of 14 to 16 above, wherein the graphite material is carbon particles containing, in an amount of 50 mass % or more, graphite particles satisfying the following requirements:
(1) $C_0$ of a (002) plane as measured by means of X-ray diffractometry is 0.6900 nm, La (the size of a crystallite as measured along the a-axis) is greater than 100 nm, and Lc (the size of a crystallite as measured along the c-axis) is greater than 100 nm;
(2) BET specific surface area is 0.2 to 5 m²/g;
(3) true density is 2.20 g/cm³ or more; and
(4) laser Raman R value (the ratio of the intensity of a peak at 1,360 cm⁻¹ in a laser Raman spectrum to that of a peak at 1,580 cm⁻¹ in the spectrum) is 0.01 to 0.9.
18. The high-density electrode according to any one of 1 to 9 above, wherein the electrode active substance is a Li alloy.
19. The high-density electrode according to any one of 1 to 9 above, wherein the electrode active substance is a lithium nitride material.
20. The high-density electrode according to any one of 1 to 9 above, wherein the electrode active substance is a silicon oxide material.
21. The high-density electrode according to any one of 1 to 9 above, wherein the electrode active substance is a metal oxide material.
22. The high-density electrode according to 21 above, wherein the metal oxide material contains a tin oxide material in an amount of 60 mass % or more.
23. The high-density electrode according to 21 above, wherein the metal oxide material contains a cobalt oxide in an amount of 60 mass % or more, and the bulk density of the electrode is 3.6 g/cm³ or more.
24. The high-density electrode according to 21 above, wherein the metal oxide material contains a manganese oxide in an amount of 60 mass % or more, and the bulk density of the electrode is 3.0 g/cm³ or more.
25. The high-density electrode according to 21 above, wherein the metal oxide material contains a mixture of a cobalt oxide and a manganese oxide in an amount of 80 mass % or more, and the bulk density of the electrode is 3.4 g/cm³ or more.

26. The high-density electrode according to 21 above, wherein the metal oxide material contains a nickel oxide in an amount of 60 mass % or more, and the bulk density of the electrode is 3.4 g/cm³ or more.

27. The high-density electrode according to 21 above, wherein the metal oxide material contains a vanadium oxide in an amount of 60 mass % or more, and the bulk density of the electrode is 2.3 g/cm³ or more.

28. The high-density electrode according to any one of 1 to 9 above, wherein the electrode active substance is a metal sulfide material.

29. The high-density electrode according to any one of 1 to 9 above, wherein the electrode active substance is an iron olivine compound.

30. The high-density electrode according to any one of 1 to 29 above, containing a carbon fiber having a filament diameter of 1 to 1,000 nm in an amount of 0.2 to 20 mass %, and having a capacity density of 100 mAh/g or higher.

31. The high-density electrode according to 30, wherein the electrode absorbs 3 μl of propylene carbonate within 500 seconds at 25° C. and 1 atm.

32. The high-density electrode according to any one of 1 to 31 above, wherein the solid polymer electrolyte comprises at least one compound having as a constituent a unit represented by formula (1) and/or (2):

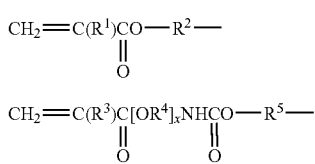

wherein $R^1$ and $R^3$ each represents a hydrogen atom or an alkyl group; $R^2$ and $R^5$ each represents a divalent group containing oxyalkylene group, fluorocarbon group and/or carbonate group; $R^4$ represents a divalent group having 10 or less carbon atoms; $R^2$, $R^4$ and $R^5$ may each include a hetero atom, and may have a linear, branched or cyclic structure; x represents 0 or an integer of 1 to 10; and in a case where two or more of polymerizable functional groups represented by the above formulae are contained in one molecule, $R^1$ to $R^5$ and x in one functional group may be the same with or different from those symbols in the other functional groups.

33. The high-density electrode according to any one of 1 to 32 above, wherein a non-aqueous solvent employed for the solid polymer electrolyte contains at least one species selected from the group consisting of ethylene carbonate, diethyl carbonate, dimethyl carbonate, methyl ethyl carbonate, propylene carbonate, butylene carbonate, and vinylene carbonate.

34. A battery comprising a high-density electrode as recited in any one of 1 to 33 above.

35. A secondary battery comprising a high-density electrode as recited in any one of 1 to 33 above.

36. A lithium battery electrode, obtained by impregnating a high-density electrode which contains a carbon fiber having a filament diameter of 1 to 1,000 nm in an amount of 0.2 to 20 mass % and has a capacity density of 100 mAh/g or higher, with a solid polymer electrolyte.

37. The lithium battery electrode according to 36 above, wherein the electrode absorbs 3 μl of propylene carbonate within 500 seconds at 25° C. and 1 atm.

38. The lithium battery electrode according to 36 or 37 above, wherein the solid polymer electrolyte comprises at least one compound having as a constituent a unit represented by formula (1) and/or (2):

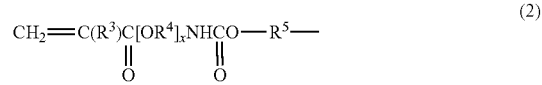

wherein $R^1$ and $R^3$ each represents a hydrogen atom or an alkyl group; $R^2$ and $R^5$ each represents a divalent group containing oxyalkylene group, fluorocarbon group and/or carbonate group; $R^4$ represents a divalent group having 10 or less carbon atoms; $R^2$, $R^4$ and $R^5$ may each include a hetero atom, and may have a linear, branched or cyclic structure; x represents 0 or an integer of 1 to 10; and in a case where two or more of polymerizable functional groups represented by the above formulae are contained in one molecule, $R^1$ to $R^5$ and x in one functional group may be the same with or different from those symbols in the other functional groups.

39. The lithium battery electrode according to any one of 36 to 38 above, wherein a non-aqueous solvent employed for the solid polymer electrolyte contains at least one species selected from the group consisting of ethylene carbonate, diethyl carbonate, dimethyl carbonate, methyl ethyl carbonate, propylene carbonate, butylene carbonate, and vinylene carbonate.

The present invention also provides a high-density electrode as described below.

40. A high-density electrode comprising a non-graphite carbon material as an electrode active substance, characterized by containing, in an amount of 0.05 to 20 mass %, carbon fiber having a filament diameter of 1 to 1,000 nm, and by having a bulk density of 1.5 g/cm³ or more.

41. A high-density electrode comprising, as an electrode active substance, a carbon material containing a graphite material in an amount of 50 mass % or more, characterized by containing, in an amount of 0.05 to 20 mass %, carbon fiber having a filament diameter of 1 to 1,000 nm, and by having a bulk density of 1.7 g/cm³ or more.

42. A high-density electrode comprising a Li alloy as an electrode active substance, characterized by containing, in an amount of 0.05 to 20 mass %, carbon fiber having a filament diameter of 1 to 1,000 nm, and by having a bulk density of 1.0 g/cm³ or more.

43. A high-density electrode comprising a lithium nitride material as an electrode active substance, characterized by containing, in an amount of 0.05 to 20 mass %, carbon fiber having a filament diameter of 1 to 1,000 nm, and by having a bulk density of 1.0 g/cm³ or more.

44. A high-density electrode comprising, as an electrode active substance, a silicon oxide material such as $SiO_2$, characterized by containing, in an amount of 0.05 to 20 mass %, carbon fiber having a filament diameter of 1 to 1,000 nm, and by having a bulk density of 1.0 g/cm³ or more.

45. A high-density electrode comprising, as an electrode active substance, a metal oxide material containing a tin oxide material such as $SnO_2$ in an amount of 60 mass % or more, characterized by containing, in an amount of 0.05 to 20 mass %, carbon fiber having a filament diameter of 1 to 1,000 nm, and by having a bulk density of 1.2 g/cm³ or more.

46. A high-density electrode comprising, as an electrode active substance, a metal oxide material containing a cobalt oxide such as lithium cobaltate in an amount of 60 mass % or more, characterized by containing, in an amount of 0.05 to 20 mass %, carbon fiber having a filament diameter of 1 to 1,000 nm, and by having a bulk density of 3.6 g/cm³ or more.

47. A high-density electrode comprising, as an electrode active substance, a metal oxide material containing a manganese oxide such as lithium manganate in an amount of 60 mass % or more, characterized by containing, in an amount of 0.05 to 20 mass %, carbon fiber having a filament diameter of 1 to 1,000 nm, and by having a bulk density of 3.0 g/cm³ or more.

48. A high-density electrode comprising, as an electrode active substance, a metal oxide material containing a mixture of a cobalt oxide such as lithium cobaltate and a manganese oxide such as lithium manganate in an amount of 80 mass % or more, characterized by containing, in an amount of 0.05 to 20 mass %, carbon fiber having a filament diameter of 1 to 1,000 nm, and by having a bulk density of 3.4 g/cm³ or more.

49. A high-density electrode comprising, as an electrode active substance, a metal oxide material containing a nickel oxide such as lithium nickelate in an amount of 60 mass % or more, characterized by containing, in an amount of 0.05 to 20 mass %, carbon fiber having a filament diameter of 1 to 1,000 nm, and by having a bulk density of 3.4 g/cm³ or more.

50. A high-density electrode comprising, as an electrode active substance, a metal oxide material containing a vanadium oxide such as vanadium pentoxide in an amount of 60 mass % or more, characterized by containing, in an amount of 0.05 to 20 mass %, carbon fiber having a filament diameter of 1 to 1,000 nm, and by having a bulk density of 2.3 g/cm³ or more.

51. A high-density electrode comprising, as an electrode active substance, a metal sulfide material such as titanium sulfide or molybdenum sulfide, characterized by containing, in an amount of 0.05 to 20 mass %, carbon fiber having a filament diameter of 1 to 1,000 nm, and by having a bulk density of 2.0 g/cm³ or more.

52. A high-density electrode comprising, as an electrode active substance, an iron olivine compound such as LiFePO₄, characterized by containing, in an amount of 0.05 to 20 mass %, carbon fiber having a filament diameter of 1 to 1,000 nm, and by having a bulk density of 2.5 g/cm³ or more.

DETAILED DESCRIPTION OF INVENTION

The present invention will next be described in detail.

1. Carbon Fiber

In general, a high-density electrode is formed through molding of electrode active substance particles having a size of several µm to several tens of µm by means of a high pressure press, and therefore the particles are deformed, spaces between the particles are reduced, and electrolytic solution permeability is lowered considerably. When tough, fine fiber which is not easily deformed by pressure is added to the electrode active substance particles, micropores are formed between the particles, and an electrolytic solution readily permeates through between the particles. If electrical conductivity between the electrode active substance particles is lowered as a result of formation of micropores, the resultant electrode exhibits impaired performance. Therefore, it is preferable that the fiber to be added exhibit excellent electrical conductivity, and that the length of the fiber filament be as long as possible so as to increase electrically conductive paths. From such a viewpoint, the fiber to be added must be fine carbon fiber exhibiting electrical conductivity and toughness.

(1-1) Diameter of Carbon Fiber

If the diameter of carbon fiber employed in the high-density electrode of the present invention is excessively large, it is not preferable in that the size of pores in the electrode becomes excessively large, and thus the electrode density cannot be increased. Since the average particle size of generally employed active substance particles is several µm to several tens of µm, the carbon fiber to be employed has a diameter of about 1 µm at most. Meanwhile, if the diameter of the carbon fiber to be employed is excessively small, it is not preferable, either, since fiber filaments of the carbon fiber tend to fill up the space between active substance particles, pores as desired cannot be formed in the electrode. Therefore, the carbon fiber to be employed must have a diameter of at least 1 to several nm. For the reasons described above, the diameter of the carbon fiber which can be employed in the high-density electrode of the present invention is 1 to 1,000 nm, preferably 5 to 500 nm, more preferably 10 to 150 nm. The average diameter of the carbon fiber is preferably 5 to 500 nm, more preferably 10 to 200 nm.

(1-2) Crystallization Degree of Carbon Fiber

The crystallization degree (i.e., graphitization degree) of the carbon fiber is preferably high. In general, the higher the graphitization degree of the carbon fiber, the more the layer structure is developed and thus the higher hardness the carbon fiber obtains, and this further leads to enhancing the electrical conductivity. Therefore, as described above, such carbon fiber is suitable for use in a high-density electrode. Graphitization of the carbon fiber can be attained through high-temperature treatment of the carbon fiber. The treatment temperature for graphitization varies depending on the type of carbon fiber, but is preferably 2,000° C. or higher, more preferably 2,500° C. or higher. When a graphitization promoter which facilitates graphitization, such as boron or Si, is added to the carbon fiber before thermal treatment, the carbon fiber can be effectively graphitized. No particular limitations are imposed on the amount of the promoter to be added, but when the amount of promoter is excessively small, the effects of the promoter are not obtained, whereas when the µmount of promoter is excessively large, the promoter remains in the carbon fiber as an impurity. Therefore, the µmount of the promoter to be added is preferably 10 mass ppm to 50,000 mass ppm.

No particular limitations are imposed on the crystallization degree of the carbon fiber. Preferably, the average interlayer distance ($d_{002}$) of the carbon fiber as measured by means of X-ray diffractometry is 0.344 nm or less, more preferably 0.339 nm or less, and the thickness (Lc) of a carbon crystal layer in the C axis direction is 40 nm or less.

(1-3) Length and Aspect Ratio of Carbon Fiber

No particular limitations are imposed on the length of the carbon fiber. As described above, the longer the carbon fiber, the more the electrical conductivity, strength, and electrolytic solution retainability of the electrode is enhanced, which is preferable. However, when the length of the carbon fiber is excessively long, dispersibility of the carbon fiber in the electrode is impaired. The average length of the carbon fiber varies depending on the type of carbon fiber, but is preferably 0.5 to 100 μm, more preferably 1 to 50 μm. When the preferred range of the average fiber length is represented by average aspect ratio (ratio of fiber length to fiber diameter), the average aspect ratio is preferably 5 to 50,000, more preferably 10 to 15,000.

When the carbon fiber contains branched carbon fiber, the electrical conductivity, strength, and electrolytic solution retainability of the electrode are further enhanced, which is preferable. However, when the amount of branched carbon fiber is excessively large, as in the case where the carbon fiber is excessively long, dispersibility of the carbon fiber in the electrode is impaired. Therefore, preferably, the amount of branched carbon fiber is regulated to an appropriate level. The amount of branched carbon fiber can be regulated to some extent by means of a carbon fiber production process or a pulverization process performed subsequent to the product process.

(1-4) Production Method for Carbon Fiber

No particular limitations are imposed on the production method for the carbon fiber employed in the present invention. Examples of the production method include a method in which a polymer is formed into fiber through spinning or a similar technique, and the resultant fiber is thermally treated in an inert atmosphere; and a vapor growth method in which an organic compound is subjected to reaction at high temperature in the presence of a catalyst. In the case of carbon fiber produced through the vapor growth method; i.e., vapor grown carbon fiber, the crystal growth direction is almost parallel to the filament axis, and the crystallinity of a graphite structure in the fiber length direction tends to be high. Therefore, the vapor grown carbon fiber has a relatively small diameter, and exhibits relatively high electrical conductivity and strength.

Vapor grown carbon fiber, which contains crystals grown in the fiber axis direction and has branches, is suitably employed for attaining the object of the present invention. Vapor grown carbon fiber can be produced through, for example, the following procedure: a gasified organic compound is fed into a high-temperature atmosphere together with iron serving as a catalyst. The vapor grown carbon fiber to be employed may be any of "as-produced" carbon fiber, carbon fiber which has undergone thermal treatment at about 800 to about 1,500° C., or carbon fiber which has undergone graphitization at about 2,000 to about 3,000° C. The vapor grown carbon fiber to be employed is appropriately chosen in accordance with the type of electrode active substance powder to be employed. However, preferably, vapor grown carbon fiber which has undergone thermal treatment, preferably graphitization, is employed, since the thus-treated carbon fiber exhibits high carbon crystallinity, high electrical conductivity, and high pressure resistance.

Branched fiber is one preferred form of the vapor grown carbon fiber. Each fiber filament of the branched carbon fiber has a hollow structure in which a hollow space extends throughout the filament, including a branched portion thereof. Therefore, a cylinder-forming carbon layer of the filament assume a continuous layer. As used herein, the term "hollow structure" refers to a cylindrical structure carbon layer(s) rolls up to form. The hollow structure encompasses a structure in which cylinder-forming carbon layers form an incomplete cylindrical shape; a structure in which the carbon layers are partially broken; and a structure in which the laminated two carbon layers are integrated into a single carbon layer. The cross section of the cylinder does not necessarily assume a round shape, and may assume an elliptical shape or a polygonal shape.

The vapor grown carbon fiber has, on its surface, large amounts of irregularities and rough portions. Therefore, the vapor grown carbon fiber advantageously exhibits enhanced adhesion to an electrode active substance. Particularly when carbonaceous powder particles are employed as an electrode active substance in a negative electrode of a secondary battery, the vapor grown carbon fiber exhibits enhanced adhesion to the carbonaceous particles serving as core material, and thus, even when charging/discharging cycles are repeated, the carbon fiber, which also serves as an electrical conductivity imparting agent, can keep adhered to the carbonaceous particles without being dissociated therefrom, whereby electronic conductivity can be maintained and cycle characteristics are improved.

When the vapor grown carbon fiber contains a large amount of branched carbon fiber, conductive networks can be formed in an efficient manner, and therefore high electronic conductivity and thermal conductivity are readily obtained. In addition, when the vapor grown carbon fiber contains a large amount of branched carbon fiber, the carbon fiber can be dispersed in the active substance as if wrapping around the substance, and thus the strength of the resultant electrode is enhanced, and good contact between the particles can be kept.

(1-5) Amount of Carbon Fiber to be Added

The amount of the carbon fiber contained in the high-density electrode is preferably 0.05 to 20 mass %, more preferably 0.1 to 15 mass %, much more preferably 0.5 to 10 mass %. When the amount of the carbon fiber exceeds 20 mass %, the amount ratio of the electrode active substance contained in the high-density electrode is lowered, and thus electric capacity is decreased, whereas when the amount of the carbon fiber is less than 0.05 mass %, the effect of improving electrolytic solution permeability is not obtained in the high-density electrode. The amount of the carbon fiber contained in the high-density electrode can be regulated to the above preferred range through incorporation of the carbon fiber to the electrode during the course of formation of the electrode such that the carbon fiber amount falls within the above range.

(1-6) Surface Treatment of Carbon Fiber

The carbon fiber may be subjected to surface treatment in order to control the dispersion state of the carbon fiber in the electrode. No particular limitations are imposed on the surface treatment method. The carbon fiber may be subjected to oxidation treatment, thereby introducing an oxygen-containing functional group into the carbon fiber, and imparting hydrophilicity thereto; or the carbon fiber may be subjected to fluorination treatment or silicon treatment, thereby imparting hydrophobicity to the carbon fiber. Also, the carbon fiber may be coated with, for example, a phenolic resin, or may be subjected to, for example, mechanochemical treatment. When the carbon fiber is subjected to excessive surface treatment, the electrical conductivity and strength of the carbon fiber are considerably impaired, and therefore surface treatment should be performed within an appropriate degree.

Oxidation treatment of the carbon fiber can be carried out for example, by heating the carbon fiber in air at 500° C. for about one hour. Through such treatment, hydrophilicity of the carbon fiber is enhanced.

2. Electrode and Active Substance Employed Therein

(2-1) High-Density Electrode Employing Carbon Material

When the active substance; i.e., the primary component in the high-density electrode of the present invention, is a carbon material, the high-density electrode is generally employed as a negative electrode of an Li ion battery or an Li polymer battery.

Examples of the carbon active substance include an active substance containing a non-graphite carbon material as a primary component, and an active substance containing a graphite carbon material as a primary component. As used herein, the term "primary component" refers to the component which accounts for 50 mass % or higher, preferably 60 mass % or higher, more preferably 80 mass % or higher, particularly preferably 90 mass % or higher, of the entirety of the substance containing the primary component.

Examples of the active substance material containing a non-graphite carbon material as a primary component include a carbon material obtained through thermal treatment of a difficult-to-graphitize polymer such as a phenolic resin; a carbon material obtained through thermal treatment of a conjugated polymer such as an electrically conductive polymer; and a CVD carbon material deposited onto a substrate by means of thermal CVD. Also, a carbon material prepared by incorporating Si into such a carbon material during the course of thermal treatment of the material, and thereby increasing the electric capacity of the resultant negative electrode is included in examples of the material.

It is preferable that such a non-graphite carbon material assume a spherical shape of high roundness, from the viewpoints of handling of the material when an electrode sheet is prepared, and prevention of side reaction between the material and an electrolytic solution when the material is employed in a battery.

The average roundness of such a non-graphite carbon material is preferably 0.70 to 0.99 as measured by use of a flow particle image analyzer.

The average particle size of such a non-graphite carbon material varies depending on the target shape of an electrode sheet, and thus no limitations are imposed on the average particle size. However, the average particle size generally falls within a range of 1 to 50 μm as measured by means of laser diffractometry.

No particular limitations are imposed on the bulk density of the high-density electrode employing such a non-graphite carbon material, since the bulk density varies depending on the true density of the carbon active substance. However, since the true density of the non-graphite carbon material is generally 1.9 g/cm$^3$ or higher, the bulk density of the electrode is preferably 1.5 g/cm$^3$ or higher.

In a Li ion battery, a graphite material has been mainly employed as the carbon active substance. The graphite active substance exhibits high crystallinity, enables uniform intercalation and release of lithium ions, and is rapidly dispersed. Therefore, when the graphite active substance is employed in a battery, the resultant battery undergoes less change in discharging potential, and exhibits excellent high load characteristics. The true density of the graphite active substance is as high as about 2.2 g/cm$^3$, and currently available electrodes incorporating the active substance have a bulk density of 1.5 g/cm$^3$. Attempts have been made to reduce the porosity of the electrode, so as to increase the bulk density of the electrode to 1.7 g/cm$^3$ or higher.

The higher the roundness of the graphite active substance, the more preferable. The active substance to be employed has an average roundness of 0.70 to 0.99 as measured by use of a flow particle image analyzer, and an average particle size of about 1 to about 50 μm as measured by means of laser diffractometry.

The higher the crystallinity of the graphite active substance, the more preferable. Preferably, $C_0$ of a (002) plane as measured by means of X-ray diffractometry is 0.6900 nm ($d_{002}$=0.3450 nm) or less, La (the size of a crystallite as measured along the a-axis) is greater than 100 nm, and Lc (the size of a crystallite as measured along the c-axis) is greater than 100 nm. Preferably, laser Raman R value (the ratio of the intensity of a peak at 1,360 cm$^{-1}$ in a laser Raman spectrum to that of a peak at 1,580 cm$^{-1}$ in the spectrum) is 0.01 to 0.9, and the true density is 2.20 g/cm$^3$ or higher.

Due to high crystallinity of graphite active substance, side reaction between the active substance and an electrolytic solution tends to be caused. Therefore, it is preferable that the specific surface area of the graphite active substance be not so large. However, when the specific surface area is excessively small, wettability of the active substance with an electrolytic solution or a binder is impaired, leading to lowering of the strength of the resultant electrode or impairment of electrolytic solution retainability. The specific surface area of the active substance is preferably 0.2 to 5 m$^2$/g (as measured by means of the BET method).

When boron is added to the graphite active substance and the resultant mixture is thermally treated, crystallinity of the active substance is enhanced, and wettability of the active substance with an electrolytic solution and stability of the active substance are improved, which is preferable. No particular limitations are imposed on the amount of boron to be added, but when the boron amount is excessively small, the effects of boron are not obtained, whereas when the boron amount is excessively large, boron remains in the active substance as an impurity. The amount of boron to be added is preferably 0.1 mass ppm to 100,000 mass ppm, more preferably 10 mass ppm to 50,000 mass ppm.

(2-2) High-Density Electrode Employing Li Alloy

Some of alloy active substances (e.g., Li alloys such as an LiAl alloy) are employed as a negative electrode material in a coin-shaped Li secondary battery. When an Li alloy is employed, Li alloy particles are compressed by use of, for example, a press, to thereby prepare an electrode. In consideration for likely occurrence of electrochemical reaction of Li ions on the electrode surface, a greater importance is attached to the electrolytic solution permeability. In this regard, an Li alloy has been employed merely in a low-load battery such as a coin-shaped battery, although Li has high theoretical intercalation/release capacity. If the electrolytic solution permeability in an Li-alloy high-density electrode is improved, and electrochemical reaction of Li ions can be caused to occur in the inside of the electrode, the high-density electrode is envisaged as constituting a next-generation Li secondary batteries. When carbon fiber is incorporated into such an Li-alloy high-density electrode to improve the electrolytic solution permeability of the electrode, the resultant electrode can be employed as an Li negative electrode of higher performance. Examples of the Li alloy include, but are not limited to, LiAl alloys, LiSn alloys, LiSi alloys, LiIn alloys, LiPb alloys, LiMg alloys, LiAg alloys, and composite alloys formed of two or more species of these alloys.

In the case where such an Li alloy is employed in a high-density electrode, the bulk density of the electrode varies depending on the type of a metal to which Li is bonded or the compositional proportions of the alloy, but the bulk density is usually about 0.7 g/cm$^3$. In the present invention, even when the bulk density of the electrode is 1.0 g/cm³ or higher, the electrode exhibits excellent electrolytic solution permeability.

(2-3) High-Density Electrode Employing Li Nitride

Li nitride materials such as $Li_3N$ and $Li_3N_xCo_y$, have become of interest as next-generation materials for Li secondary batteries, and such Li nitride materials have been under development. Similar to the case of the aforementioned Li alloy, when carbon fiber is incorporated into such an Li nitride material, the resultant high-density electrode exhibits excellent electrolytic solution permeability.

In the case where such an Li nitride material is employed in an electrode, the bulk density of the electrode is usually about 0.7 g/cm³. In the present invention, even when the bulk density of the electrode is increased to 1.0 g/cm³ or higher, the electrode exhibits excellent electrolytic solution permeability.

(2-4) High-Density Electrode Employing Oxide or Sulfide

There has been employed, as a positive electrode active substance for an Li ion battery, a cobalt oxide such as lithium cobaltate, a manganese oxide such as lithium manganate, a nickel oxide such as lithium nickelate, a vanadium oxide such as vanadium pentoxide, a composite oxide formed of such oxides, or a mixture of such oxides. Attempts have been made to increase the density of a positive electrode formed of such an oxide, thereby increasing the capacity of the resultant battery.

Specifically, the true density of lithium cobaltate is about 5.1 g/cm³, and currently available electrodes incorporating lithium cobaltate have a bulk density of less than 3.3 g/cm³. When carbon fiber is added to such an electrode, even if the bulk density of the electrode is increased to 3.6 g/cm³, impairment of electrolytic solution permeability can be prevented. Currently available electrodes incorporating lithium manganate, whose true density is about 4.2 g/cm³, have a bulk density of less than 2.9 g/cm³. When carbon fiber is added to such an electrode, even if the bulk density of the electrode is increased to 3.0 g/cm³, impairment of electrolytic solution permeability can be prevented. Currently available electrodes incorporating lithium nickelate, whose true density is about 5.0 g/cm³, have a bulk density of 3.2 g/cm³ or less. When carbon fiber is added to such an electrode, even if the bulk density of the electrode is increased to 3.5 g/cm³, impairment of electrolytic solution permeability can be prevented. Currently available electrodes incorporating vanadium pentoxide, whose true density is about 2.9 g/cm³, have a bulk density of 2.0 g/cm³ or less. When carbon fiber is added to such an electrode, even if the bulk density of the electrode is increased to 2.3 g/cm³, impairment of electrolytic solution permeability can be prevented.

A mixture of a cobalt oxide such as lithium cobaltate and a manganese oxide such as lithium manganate has been employed in an electrode having a bulk density of 3.1 g/cm³ or less. When carbon fiber is added to the electrode, even if the bulk density of the electrode is increased to 3.4 g/cm³, impairment of electrolytic solution permeability can be prevented.

In the present invention, a lithium-containing transition metal oxide employed as a positive electrode active substance is preferably an oxide predominantly containing lithium and at least one transition metal selected from among Ti, V, Cr, Mn, Fe, Co, Ni, Mo, and W, in which the ratio by mol between lithium and the transition metal is 0.3 to 2.2. More preferably, the positive electrode active substance is an oxide predominantly containing lithium and at least one transition metal selected from among V, Cr, Mn, Fe, Co, and Ni, in which the ratio by mol between lithium and the transition metal is 0.3 to 2.2. The positive electrode active substance may contain Al, Ga, In, Ge, Sn, Pb, Sb, Bi, Si, P, B, etc. in an amount of less than 30 mol % on the basis of the entirety of the transition metal serving as a predominant component. Of the aforementioned positive electrode active substances, a preferred substance is at least one species selected from among materials being represented by the formula $Li_xMO_2$ (wherein M represents at least one element selected from among Co, Ni, Fe, and Mn, and x is 0 to 1.2); or at least one species selected from among materials having a spinel structure and being represented by the formula $Li_yN_2O_4$ (wherein N includes at least Mn, and y is 0 to 2).

Particularly preferably, the positive electrode active substance is at least one species selected from among materials containing $Li_yM_aD_{1-a}O_2$ wherein M represents at least one element selected from among Co, Ni, Fe, and Mn; D represents at least one element selected from among Co, Ni, Fe, Mn, Al, Zn, Cu, Mo, Ag, W, Ga, In, Sn, Pb, Sb, Sr, B, and P, with the proviso that D does not represent the same element with the element represented by M at the same time; y is 0 to 1.2; and a is 0.5 to 1; or at least one species selected from among materials having a spinel structure and being represented by the formula $Li_z(N_bE_{1-b})_2O_4$ wherein N represents Mn; E represents at least one element selected from among Co, Ni, Fe, Mn, Al, Zn, Cu, Mo, Ag, W, Ga, In, Sn, Pb, Sb, Sr, B, and P; b is 1 to 0.2; and z is 0 to 2.

Specific examples of the positive electrode active substance include $Li_xCoO_2$, $Li_xNiO_2$, $Li_xMnO_2$, $Li_xCO_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ wherein x is 0.02 to 1.2, a is 0.1 to 0.9, b is 0.8 to 0.98, c is 1.6 to 1.96, and z is 2.01 to 2.3. Examples of most preferred lithium-containing transition metal oxides include $Li_xCoO_2$, $Li_xNiO_2$, $Li_xMnO_2$, $Li_xCO_aNi_{1-a}O_2$, $Li_xMn_2O_4$, and $Li_xCo_bV_{1-b}O_z$ wherein x is 0.02 to 1.2, a is 0.1 to 0.9, b is 0.9 to 0.98, and z is 2.01 to 2.3. The value x is a value as measured before initiation of charging/discharging, and is increased or decreased through charging/discharging.

Many attempts have been made to employ a metal sulfide (e.g., titanium sulfide or molybdenum sulfide) as a next-generation positive electrode material for Li batteries, and to form a high-density electrode from such a material. In the present invention, since carbon fiber is added to an electrode employing such a metal sulfide, even if the bulk density of the electrode is increased to 2.0 g/cm³, impairment of electrolytic solution permeability can be prevented.

An iron olivine compound such as $LiFePO_4$ has high theoretical capacity, and, since containing iron, such a compound is excellent in terms of, for example, availability, environmental safety, and heat resistance. Therefore, many attempts have energetically been pursued to employ such an iron olivine compound as a next-generation positive electrode material for Li ion batteries. $LiFePO_4$ has a true density of 3.6 g/cm³, which is lower than that of a positive electrode material (e.g., lithium cobaltate) currently employed in a lithium ion battery, and therefore, there exists keen demand for a technique capable of increasing the density of $LiFePO_4$. In the present invention, since carbon fiber is added to an electrode employing such an iron olivine compound, even if the bulk density of the electrode is increased to 2.5 g/cm³, impairment of electrolytic solution permeability can be prevented. In addition, since an iron olivine compound has a low electrical conductivity, it is necessary to combine such an iron olivine compound with a carbon-fiber-based electrically conductive material to effectively increase the electrical conductivity.

No particular limitations are imposed on the average particle size of the positive electrode active substance, but the average particle size is preferably 0.1 to 50 µm. Preferably, the volume of particles having a particle size of 0.5 to 30 µm is 95% or more on the basis of the entire volume of the positive electrode active substance particles. More preferably, the volume of particles having a particle size of 3 µm or less is 18% or less on the basis of the entire volume of the positive electrode active substance particles, and the volume of particles having a particle size of 15 µm to 25 µm inclusive is 18% or less on the basis of the entire volume of the positive electrode active substance particles. No particular limitations are imposed on the specific surface area of the positive electrode active substance, but the specific surface area as measured by means of the BET method is preferably 0.01 to 50 $m^2/g$, particularly preferably 0.2 $m^2/g$ to 10 $m^2/g$.

Attempts have been made to employ, as next-generation high-capacity negative electrode active substances for Li ion batteries, tin oxide materials such as $SnO_2$, titanium oxide materials such as $TiO_2$, and silicon oxide materials such as $SiO_2$. Some of tin oxide materials have been employed as a negative electrode material for coin-shaped Li ion batteries. When such a tin oxide material is employed in a large-sized high-load battery assuming a cylindrical or rectangular shape, electrochemical reaction does proceeds non-uniformly in the battery, and thus the electrolytic solution permeability of the electrode must be improved through addition of carbon fiber. In the case where such a tin oxide material is employed in an electrode, the bulk density of the electrode is usually about 1.0 $g/cm^3$. In the present invention, even when the bulk density of the electrode is increased to 1.2 $g/cm^3$ or higher, the electrode exhibits excellent electrolytic solution permeability. In the case where such a silicon oxide material is employed in an electrode, the bulk density of the electrode is usually about 0.8 $g/cm^3$. In the present invention, even when the bulk density of the electrode is increased to 1.0 $g/cm^3$ or higher, the electrode exhibits excellent electrolytic solution permeability.

3. Preparation of Electrode

No particular limitations are imposed on the preparation method for the high-density electrode of the present invention. In general, the high-density electrode can be produced by mixing an electrode active substance, carbon fiber, and a binder material together, and subsequently applying the resultant mixture onto a carrier substrate such as a metallic collector, followed by drying and pressing.

Examples of the method for mixing the electrode materials include (1) a method in which an electrode active substance (which, if desired, contains an electrical conductivity imparting agent such as carbon black; the same shall apply hereinafter), carbon fiber and a binder material are mixed at once; (2) a method in which an electrode active substance and carbon fiber are mixed together, and then the resultant mixture is mixed with a binder material; (3) a method in which an electrode active substance and a binder material are mixed together, and then the resultant mixture is mixed with carbon fiber; and (4) a method in which carbon fiber and a binder material are mixed together, and then the resultant mixture is mixed with an electrode active substance.

The dispersion state of the electrode material mixture in the electrode varies depending on, for example, the types, compositional proportions, and combinations of the electrode materials. Since the dispersion state affects the resistance, liquid absorbability, or other characteristics of the electrode, a suitable mixing method must be chosen in accordance with the conditions.

Mixing of the electrode active substance and carbon fiber can be carried out through stirring by use of, for example, a mixer. No particular limitations are imposed on the stirring method, and stirring can be carried out by use of any apparatus such as a ribbon mixer, a screw kneader, a Spartan ryuzer, a Lodige mixer, a planetary mixer, or a general-purpose mixer.

No particular limitations are imposed on the method for mixing a binder material with an electrode active substance, carbon fiber, or a mixture of the electrode active substance and carbon fiber. Examples of the mixing method include a method in which these materials are dry-mixed together, and then the resultant mixture is kneaded by use of a solvent; and a method in which a binder material is diluted with a solvent, and the thus-diluted binder material is kneaded with a negative electrode material; i.e., an electrode active substance, carbon fiber, or a mixture of the electrode active substance and carbon fiber. The resultant solvent-containing mixture is applied onto a collector (substrate), followed by formation of an electrode sheet. In order to regulate the viscosity of the solvent-containing mixture, a thickener such as CMC (sodium carboxymethyl cellulose) or a polymer (e.g., polyethylene glycol) may be added to the mixture.

Examples of the binder material which may be employed include known binder materials, such as fluorine-containing polymers (e.g., polyvinylidene fluoride and polytetrafluoroethylene), and rubbers (e.g., SBR (styrene-butadiene rubber)). Any known solvent suitable for a binder to be used may be employed. When a fluorine-containing polymer is employed as a binder, for example, toluene, N-methylpyrrolidone, or acetone is employed as a solvent. When SBR is employed as a binder, for example, known solvent, such as water is employed.

The amount of the binder to be employed is preferably 0.5 to 20 parts by mass, particularly preferably about 1 to about 15 parts by mass, on the basis of 100 parts by mass of the negative electrode material.

No particular limitations are imposed on the method for kneading, which is performed after addition of the solvent, and kneading can be carried out by use of any known apparatus such as a ribbon mixer, a screw kneader, a Spartan ryuzer, a Lodige mixer, a planetary mixer, or a general-purpose mixer.

The high-density electrode sheet of the present invention can be prepared by applying the above-kneaded mixture to a collector.

Application of the thus-kneaded mixture to a collector may be carried out by means of any known method. For example, the mixture is applied to the collector by use of a doctor blade, a bar coater, or a similar apparatus, and then the resultant collector is subjected to molding through, for example, roll pressing.

Examples of the collector which may be employed include known materials such as copper, aluminum, stainless steel, nickel, alloys thereof, and carbon sheet.

The mixture-applied electrode sheet is dried by means of a known method, and subsequently the resultant sheet is subjected to molding so as to attain predetermined thickness and density, while the porosity of the sheet is regulated to be 25% or less by means of a known technique such as roll pressing or stamping pressing.

The pressing pressure may be of any value, so long as the porosity of the electrode sheet can be regulated to 25% or less. The pressuring pressure varies depending on the type of the electrode active substance to be employed, but the pressure is usually determined to be 1 $ton/cm^2$ or higher. No particular limitations are imposed on the thickness of the electrode sheet, since the thickness varies in accordance with the target shape of the resultant battery. The electrode sheet thickness is usually regulated to 0.5 to 2,000 µm, preferably 5 to 1,000 µm.

The thus-produced lithium battery electrode of the present invention exhibits high electrolytic solution permeability. As an indicator of the high electrolytic solution permeability, for example, it is preferable that such an electrode have a property that 3 µl of propylene carbonate can be absorbed within 500 seconds at 25° C. at 1 atm.

4. Production of Battery

The battery of the present invention, which employs the aforementioned high-density electrode as a positive electrode and/or a negative electrode, can be produced by means of a known method.

Particularly, the aforementioned high-density electrode is preferably employed as an electrode of a non-aqueous secondary battery of high energy density, such as an Li ion battery or an Li polymer battery. Next will be described a typical production method for an Li ion battery and/or an Li polymer battery, but the battery production method is not limited to the below-described method.

The above-prepared high-density electrode sheet is formed into a desired shape, and the resultant sheet is prepared into a laminate of positive electrode sheet/separator/negative electrode sheet, so that the positive electrode and the negative electrode may not be in direct contact with each other. The thus-prepared laminate is accommodated in a container assuming, for example, a coin-like shape, a rectangular shape, a cylindrical shape, or a sheet-like shape. When there is a possibility that the laminate adsorbs moisture or oxygen during the course of lamination or accommodation, the laminate, as accommodated in the container, is again dried under reduced pressure and/or in an inert atmosphere of low dew point (−50° C. or lower), and then the laminate is transferred into an inert atmosphere of low dew point. Subsequently, at least one selected from a group consisting of an electrolytic solution, solid polymer electrolyte and polymerizable compound is injected into the container. In a case where polymerizable compound is injected, further step of impregnating the electrode with electrolytic solution is conducted. Then the container is sealed to thereby produce a Li ion battery or a Li polymer battery.

A battery may be produced by impregnating the electrode of the present invention with thermoplastic polymer serving as solid polymer electrolyte, injecting electrolytic solution into the battery container, and sealing the container. In this case, before the impregnation, a plasticizer may be added to a thermoplastic resin, which serves as thermoplastic polymer. After the impregnation, whole or a part of the plasticizer may be removed by, for example, drying, or may be substituted by other solvents.

Any known separator may be employed, but polyethylene- or polypropylene-made microporous film is preferred, from the viewpoints of small thickness and high strength. The porosity of the separator is preferably high, from the viewpoint of ionic conduction. However, when the porosity is excessively high, the strength of the separator may be lowered, and short circuit between the positive and negative electrodes may be caused to occur. Therefore, the porosity of the separator is usually regulated to 30 to 90%, preferably 50 to 80%. Meanwhile, the thickness of the separator is preferably small, from the viewpoints of ionic conduction and battery capacity. However, when the thickness is excessively small, the strength of the separator may be lowered, and short circuit between the positive and negative electrodes may be caused to occur. Therefore, the thickness of the separator is usually regulated to 5 to 100 µm, preferably 5 to 50 µm. Such microporous films may be employed in combination of two or more species, or may be employed in combination with another type of separator, such as non-woven fabric.

In a non-aqueous secondary battery, particularly a lithium ion battery and/or an Li polymer battery, the electrolytic solution may be any known organic electrolytic solution, and the electrolyte may be any known inorganic solid electrolyte or solid polymer electrolyte.

Preferred examples of non-aqueous solvent used in the organic electrolytic solution (non-aqueous electrolytic solution) are organic solvents, which include ethers such as diethyl ether, dibutyl ether, ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol dimethyl ether, and ethylene glycol phenyl ether; amides such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, and hexamethylphosphoryl amide; sulfur-containing compounds such as dimethyl sulfoxide and sulfolane; dialkyl ketones such as methyl ethyl ketone and methyl isobutyl ketone; cyclic ethers such as ethylene oxide, propylene oxide, tetrahydrofuran, 2-methoxytetrahydrofuran, 1,2-dimethoxyethane, and 1,3-dioxolan; carbonates such as ethylene carbonate, butylene carbonate, diethyl carbonate, dimethyl carbonate, methyl ethyl carbonate, propylene carbonate, and vinylene carbonate; γ-butyrolactone; N-methylpyrrolidone; acetonitrile; and nitromethane. More preferred examples include esters such as ethylene carbonate, butylene carbonate, diethyl carbonate, dimethyl carbonate, methyl ethyl carbonate, propylene carbonate, vinylene carbonate, and γ-butyrolactone; ethers such as dioxolan, diethyl ether, and diethoxyethane; dimethyl sulfoxide; acetonitrile; and tetrahydrofuran. Particularly, carbonate-based non-aqueous solvents such as ethylene carbonate and propylene carbonate are preferably employed. These solvents may be employed singly or in combination of two or more species.

A lithium salt is employed as a solute (electrolyte) which is to be dissolved in the aforementioned solvent. Examples of generally known lithium salts include $LiClO_4$, $LiBF_4$, $LiPF_6$, $LiAlCl_4$, $LiSbF_6$, LiSCN, LiCl, $LiCF_3SO_3$, $LiCF_3CO_2$, and $LiN(CF_3SO_2)_2$.

Examples of the solid polymer electrolyte include polyalkylene oxide derivatives such as polyethylene oxide and polypropylene oxide, polymers containing such a derivative, derivatives of polymers such as poly(vinylidene fluoride), poly(hexafluoropropylene), polycarbonate, phosphate ester polymer, polyalkylimine, polyacrylonitrile, poly(meth) acrylic acid ester, phosphonitrilic chloride, polyurethane, polyamide, polyester and polysiloxane, and polymers containing such a derivative.

Among the above compounds, compounds such as polyalkylene oxide, polyurethane, polycarbonate, which each contains oxyalkylene structure, urethane structure, or carbonate structure in the molecule, are preferred for their solubility with solvent and excellence in electrochemical stability. Also, compounds such as poly(vinylidene fluoride) and poly (hexafluoropropylene), which each contains a fluorocarbon group in the molecule, are preferred in terms of stability. A polymer compound which contains all or some of oxyalkylene group, urethane group, carbonate group and fluorocarbon group may also be employed. The number of times for repeating these respective groups may be from 1 to 100, preferably from 5 to 100.

Particularly, for its viscoelasticity, its capability of maintaining adhesion to electrodes and its strength, crosslinked polymer is suitably used as a solid polymer electrolyte in the present invention. The term "crosslinked polymer" used herein includes not only a compound where a crosslinking chain is formed of covalent bonding, but also a compound where a side chain is crosslinked by ion bonding, hydrogen bonding or the like and a compound physically crosslinked through addition of various additives.

One example of solid polymer electrolyte used in the present invention is a composition containing at least one compound having as a constituent a unit represented by formula (1) and/or (2) below.

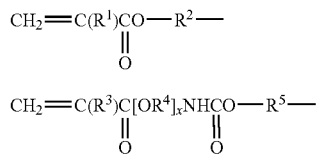

In the formulae, $R^1$ and $R^3$ each represents a hydrogen atom or an alkyl group. $R^2$ and $R^5$ each represents a divalent group containing oxyalkylene group, fluorocarbon group and/or carbonate group. $R^4$ represents a divalent group having 10 or less carbon atoms. $R^2$, $R^4$ and $R^5$ may each include a hetero atom, and may have a linear, branched or cyclic structure. x represents 0 or an integer of 1 to 10. In a case where two or more of polymerizable functional groups represented by the above formulae are contained in one molecule, $R^1$ to $R^5$ and x in one functional group may be the same with or different from those symbols in the other functional groups. Such a solid polymer electrolyte is described in, for example, JP-A-11-149824 and JP-A-11-147989.

As organic solvent and its solute for the solid polymer electrolyte, the above-mentioned organic electrolytic solutions can be used. Among these, preferred are ethers and carbonates, and more preferred are carbonates.

The larger the amount of the organic electrolytic solution added to the solid polymer electrolyte is, the more the ionic conductivity of the solid polymer electrolyte is improved, and with this, the viscosity of the solid polymer electrolyte is reduced, so that the rate of impregnation into the electrode is enhanced. However, if the addition amount is excessively large, the mechanical strength of the solid polymer electrolyte deteriorates. The addition amount of the organic electrolytic solution is 2 to 30 times the mass of the polymer used for the solid polymer electrolyte, and particularly preferably 3 to 15 times.

No particular limitations are imposed on the elements (exclusive of the aforementioned elements) which are required for producing a battery.

BEST MODE FOR CARRYING OUT THE INVENTION

The present invention will next be described in more detail with reference to representative examples, which are provided for illustration purposes only and should not be construed as limiting the invention thereto.

In the below-described Examples, physical properties, etc. were measured by means of the following methods.

[1] Average Roundness:

The average roundness of a carbon material was measured by use of flow particle image analyzer FPIA-2100 (product of Sysmex Corporation) as described below.

A measurement sample was subjected to cleaning (removal of micro dust) by use of a 106-μm filter. The sample (0.1 g) was added to ion-exchange water (20 ml), and an anionic/nonionic surfactant (0.1 to 0.5 mass %) was added to the resultant mixture so as to uniformly disperse the sample in the mixture, thereby preparing a sample dispersion for measurement. Dispersing of the sample was carried out for five minutes by use of ultrasonic cleaner UT-105S (product of Sharp Manufacturing Systems Corporation).

The summary of measurement principle, etc. is described in, for example, "*Funtai to Kogyo*," VOL. 32, No. 2, 2000, and JP-A-8-136439. Specifically, the average roundness is measured as follows.

When the measurement sample dispersion passes through the flow path of a flat, transparent flow cell (thickness: about 200 μm), the dispersion is irradiated with strobe light at intervals of 1/30 seconds, and photographed by a CCD camera. A predetermined number of the thus-captured still images of the dispersion were subjected to image analysis, and the average roundness was calculated by use of the following formula.

Roundness=(the peripheral length of a circle as calculated from a circle-equivalent diameter)/(the peripheral length of a projected image of a particle)

The term "circle-equivalent diameter" refers to the diameter of a true circle having an area equal to the actual projection area of a particle that has been obtained from a photograph of the particle. The roundness of the particle is obtained by dividing the peripheral length of a circle as calculated from the circle-equivalent diameter by the actual peripheral length of the projected particle. For example, a particle having a true round shape has a roundness of 1, whereas a particle having a more complicated shape has a roundness of a smaller value. The average roundness of particles is the average of the roundnesses of the measured particles as obtained by means of the above-described method.

[2] Average Particle Size:

The average particle size was measured by use of a laser diffraction scattering particle size analyzer (Microtrac HRA, product of Nikkiso Co., Ltd.).

[3] Specific Surface Area:

The specific surface area was measured by use of a specific surface area measuring apparatus (NOVA-1200, product of Yuasa Ionics Inc.) by means of the BET method, which is generally employed for specific surface area measurement.

[4] Battery Evaluation Method:

(1) Kneaded Paste for Forming Electrode:

An electrode active substance, Acetylene Black (abbreviated as "AB", product of Denki Kagaku Kogyo Kabushiki Kaisha), and carbon fiber were dry-mixed in predetermined compositional proportions (30 seconds×twice) by use of a high-speed small-sized mixer equipped with blades (IK mixer) at 10,000 rpm, to thereby prepare an electrode material mixture. To the thus-prepared mixture, KF Polymer L1320 (an N-methylpyrrolidone (NMP) solution containing 12 mass % polyvinylidene fluoride (PVDF), product of Kureha Chemical Industry Co., Ltd.) was added such that the ratio by mass of the electrode material mixture to PVDF became 96:4, and the resultant mixture was kneaded by use of a planetary mixer, to thereby prepare a kneaded paste for forming an electrode.

(2) Formation of Electrodes

NMP was further added to the kneaded paste so as to regulate the viscosity of the paste. By use of a doctor blade, the resultant mixture was applied onto a rolled copper foil (product of Nippon Foil Mfg Co., Ltd.) (thickness: 18 μm) for a negative electrode so as to attain a predetermined thickness, and separately, the mixture was applied onto a rolled Al foil (product of Showa Denko K.K.) (thickness: 25 μm) for a positive electrode so as to attain a predetermined thickness. Each of the resultant foils was dried under vacuum at 120° C. for one hour, and then subjected to punching, to thereby form electrodes each having a size of 18 mmΦ. Each of the thus-formed electrodes was sandwiched between super-steel-made pressing plates, and then subjected to pressing such that a pressure of about $1 \times 10^2$ to $3 \times 10^2$ N/mm² ($1 \times 10^3$ to $3 \times 10^3$ kg/cm²) was applied to each of the electrodes, to thereby attain a thickness of about 100 μm and a target electrode density. Thereafter, the resultant electrodes were dried in a vacuum drying apparatus at 120° C. for 12 hours, and then employed for evaluation.

(3) Evaluation of Permeation Rate of Electrolytic Solution and Composition for Solid Polymer Electrolyte A 3-μl drop of propylene carbonate (PC), which exhibits a viscosity almost equal to that of an electrolytic solution at 25° C. in air and has low volatility, was placed onto the center part of the electrode (18 mmΦ) formed above in (2) in air at 25° C. by use of a microsyringe, and the time required for PC to permeate into the electrode was measured. Measurement of the permeation time was performed three times, and the average of the thus-obtained values was employed for evaluation.

Evaluation of permeation rate of composition for solid polymer electrolyte was made in the same manner as above, by using, instead of PC, a mixed solution of solid polymer electrolyte composition containing PC.

As polymerizable compound contained in solid polymer electrolyte composition, the following compounds were prepared based compositions described in JP-A-11-149824.

Compound a: average molecular weight 1100

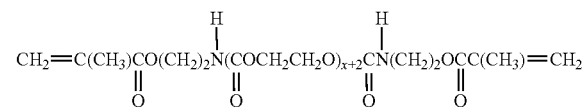

Compound b: average molecular weight 1500

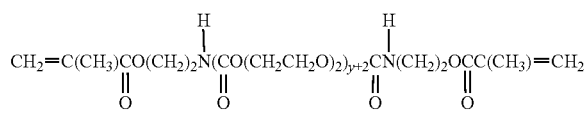

Composition a-1 was prepared as a mixed solution of Compound a (1 mass part) and PC (12 mass parts). Similarly, Composition b-1 was prepared as a mixed solution of Compound b (1 mass part) and PC (12 mass parts).

(4) Production of Li Ion Cell and Li Ion Polymer Cell for Testing

A three-electrode cell was produced as follows. The below-described procedure was carried out in an atmosphere of dried argon having a dew point of −80° C. or lower.

In a polypropylene-made cell (inner diameter: about 18 mm) having a screw cap, a separator (polypropylene-made microporous film (Celgard 2400), 25 μm) was sandwiched between the negative electrode having copper-foil and the positive electrode having Al-foil, which were obtained in (2) above, to thereby form a laminate. Subsequently, a metallic lithium foil (50 μm) serving as a reference electrode was laminated in a manner similar to that described above. Thereafter, an electrolytic solution was added to the cell, to thereby obtain a Li ion cell for testing.

Similarly, a Li ion polymer cell was also produced in an atmosphere of dried argon having a dew point of −80° C. or lower.

In a polypropylene-made cell (inner diameter: about 18 mm) having a screw cap, a separator (polypropylene-made microporous film (Celgard 2400), 25 μm was sandwiched between the negative electrode having copper-foil and the positive electrode having Al-foil, which were obtained in (2) above, to thereby form a laminate. Subsequently, a metallic lithium foil (50 μm) serving as a reference electrode was laminated in a manner similar to that described above. Thereafter, a solid polymer electrolyte composition was added to the cell and heated at 60° C. for 1 hour, to thereby obtain a Li ion polymer cell for testing.

(5) Electrolytic Solution and Composition for Solid Polymer Electrolyte

The electrolytic solution was prepared by dissolving $LiPF_6$ (1 mol/liter), serving as an electrolyte, in a mixture of EC (ethylene carbonate) (8 parts by mass) and DEC (diethyl carbonate) (12 parts by mass).

As the polymerizable composition for solid polymer electrolyte, by dissolving $LiPF_6$ (1 mol/liter) serving as an electrolyte, in a mixture of the above shown Compound a (1 mass part), EC (ethylene carbonate) (4 parts by mass) and DEC (diethyl carbonate) (6 parts by mass), and adding thereto bis(4-t-butylcyclohexyl)peroxydicarbonate (0.01 mass part) serving as polymerization initiator, Composition a-2 was prepared.

Also, by using Compound b which has a different molecular weight from Compound a, Composition b-2 having the same composition as in Composition a-2 was prepared.

(6) Charging/Discharging Cycle Test

Constant-current constant-voltage charging/discharging test was performed at a current density of 0.6 mA/cm² (corresponding to 0.3 C).

Constant-current (CC) charging was performed at 0.6 mA/cm² while voltage was increased from rest potential to 4.2 V. Subsequently, constant-voltage (CV) charging was performed at 4.2 V, and charging was stopped when the current value decreased to 25.4 μA.

CC discharging was performed at 0.6 mA/cm² (corresponding to 0.3 C), and was cut off at a voltage of 2.7 V.

[5] Porosity of Electrode

The porosity of an electrode was calculated by use of the following formula.

Porosity (%)={1−(bulk density of the electrode/true density of the electrode)}×100

The bulk density of the electrode was calculated from the dimensions and mass of the electrode. The true density of the electrode was obtained through the following procedure: the true densities of the electrode active substance, carbon fiber, conductivity promoter (AB), and binder were respectively measured by use of a gravimeter, and the true density of the electrode was calculated on the basis of the mixing proportions of these materials.

EXAMPLE 1

Evaluation of Electrolytic Solution Permeability of Electrode

Electrodes were formed from the below-described negative electrode active substances, positive electrode active substances, and carbon fibers by means of the method described above in (1) and (2), and the PC permeation rate was measured by means of the method described above in (3). Table 1 shows the composition and density of the electrode, and the evaluation results.

<Negative Electrode Active Substance>
MCMB: mesophase spherical graphite particles (product of Osaka Gas Chemicals Co., Ltd.)
  average particle size: 16.6 μm
  average roundness: 0.94
  X-ray $C_0$: 0.6729 nm, Lc: 84.4 nm
  Raman R value: 0.12
  specific surface area: 2 m$^2$/g
  true density: 2.19 g/cm$^3$
SCMG: spherical graphite particles (product of Showa Denko K.K.)
  average particle size: 24.5 μm
  average roundness: 0.934
  X-ray $C_0$: 0.6716 nm, Lc: 459.0 nm
  Raman R value: 0.05
  specific surface area: 1.1 m$^2$/g
  true density: 2.17 g/cm$^3$ <Positive Electrode Active Substance>
$LiCoO_2$: product of Nihon Kagaku Co., Ltd., average particle size: 28.9 μm, average roundness: 0.96
$Li_2Mn_2O_4$: product of Mitsui Mining and Smelting Co., Ltd., average particle size: 17.4 μm, average roundness: 0.94

<Carbon fiber>
VGCF: Vapor Grown Graphite Fiber
  average fiber diameter
    (obtained through SEM image analysis): 150 nm
  average fiber length
    (obtained through SEM image analysis): 8 μm
  average aspect ratio: 60
  branching degree
  (the number of branches per μm of carbon fiber filament as calculated through SEM image analysis; the same shall apply hereinafter): 0.1 branches/μm
  X-ray $C_0$: 0.6767 nm, Lc: 48.0 nm
VGCF-A: Vapor Grown Carbon Fiber
  (non-graphitized VGCF, fired at 1,200° C.)
  average fiber diameter
    (obtained through SEM image analysis): 150 nm
  average fiber length
    (obtained through SEM image analysis): 8 μm
  average aspect ratio: 70
  branching degree: 0.1 branches/μm
  X-ray $C_0$: 0.6992 nm, Lc: 3.0 nm
VGCF-B: Vapor Grown Graphite Fiber
  (addition of 1% boron during graphitization of VGCF)
  average fiber diameter
    (obtained through SEM image analysis): 150 nm
  average fiber length
    (obtained through SEM image analysis): 8 μm
  average aspect ratio: 55
  branching degree: 0.1 branches/μm
  X-ray $C_0$: 0.6757 nm, Lc: 72.0 nm
VGCF-H: Vapor Grown Graphite Fiber
  (VGCF pulverized by use of a jet mill)
  average fiber diameter
    (obtained through SEM image analysis): 150 nm
  average fiber length
    (obtained through SEM image analysis): 5 μm
  average aspect ratio: 37
  branching degree: 0.1 branches/μm
  X-ray $C_0$: 0.6769 nm, Lc: 47.0 nm
VGNF: Vapor Grown Graphite Fiber
  average fiber diameter
    (obtained through SEM image analysis): 80 nm
  average fiber length
    (obtained through SEM image analysis): 6 μm
  average aspect ratio: 73
  branching degree: 0.1 branches/μm
  X-ray $C_0$: 0.6801 nm, Lc: 35.0 nm
VGNT: Vapor Grown Graphite Fiber
  average fiber diameter
    (obtained through SEM image analysis): 20 nm
  average fiber length
    (obtained through SEM image analysis): 6 μm
  average aspect ratio: 90
  branching degree: 0.1 branches/μm
  X-ray $C_0$: 0.6898 nm, Lc: 30.0 nm

TABLE 1

Electrolytic solution permeation rate in electrode containing carbon fiber

| Electrode material | Active substance | Carbon fiber | Proportions by mass (active substance/ carbon fiber/AB) | Electrode density (g/cm$^3$) | Porosity (%) | Permeation rate (seconds) |
| --- | --- | --- | --- | --- | --- | --- |
| MCMB negative electrode | | | | | | |
| MCMBre-1 | MCMB | None | 95/0/5 | 1.6 | 22.7 | 150 |
| MCVC1-1 | | VGCF | 95/2/3 | | 23.4 | 100 |
| MCVC2-1 | | VGCF | 95/5/0 | | 24.2 | 80 |
| MCVCA-1 | | VGCF-A | 95/2/3 | | 23.4 | 80 |
| MCVCB-1 | | VGCF-B | 95/2/3 | | 23.4 | 100 |
| MCVCH-1 | | VGCF-H | 95/2/3 | | 23.4 | 110 |

TABLE 1-continued

Electrolytic solution permeation rate in electrode containing carbon fiber

| Electrode material | Active substance | Carbon fiber | Proportions by mass (active substance/ carbon fiber/AB) | Electrode density (g/cm³) | Porosity (%) | Permeation rate (seconds) |
|---|---|---|---|---|---|---|
| MCVN-1 | | VGNF | 95/2/3 | | 23.4 | 80 |
| MCVNT-1 | | VGNT | 95/2/3 | | 23.4 | 120 |
| MCMBre-2 | | None | 95/0/5 | 1.8 | 13.0 | 1050 |
| MCVC1-2 | | VGCF | 95/2/3 | | 13.9 | 380 |
| MCVC2-2 | | VGCF | 95/5/0 | | 14.7 | 210 |
| MCVCA-2 | | VGCF-A | 95/2/3 | | 13.9 | 250 |
| MCVCB-2 | | VGCF-B | 95/2/3 | | 13.9 | 400 |
| MCVCH-2 | | VGCF-H | 95/2/3 | | 13.9 | 410 |
| MCVN-2 | | VGNF | 95/2/3 | | 13.9 | 330 |
| MCVCT-2 | | VGNT | 95/2/3 | | 13.9 | 510 |
| SCMG negative electrode | | | | | | |
| SCMGre-1 | SCMG | None | 95/0/5 | 1.6 | 13.0 | 180 |
| SCMG1-1 | | VGCF | 95/2/3 | | 13.9 | 120 |
| SCVC2-1 | | VGCF | 95/5/0 | | 14.7 | 80 |
| SCMGre-2 | | None | 95/0/5 | 1.8 | 13.0 | 720 |
| SCVC1-2 | | VGCF | 95/2/3 | | 13.9 | 320 |
| SCVC2-2 | | VGCF | 95/5/0 | | 14.7 | 250 |
| $LiCoO_2$ positive electrode | | | | | | |
| $CoO_2$re-1 | $LiCoO_2$ | None | 95/0/5 | 3.3 | 27.9 | 200 |
| CoVC-1 | | VGCF | 95/2/3 | | 28.1 | 150 |
| $CoO_2$re-2 | | None | 95/0/5 | 3.7 | 19.2 | 1250 |
| CoVC-2 | | VGCF | 95/2/3 | | 19.4 | 450 |
| $LiMn_2O_4$ positive electrode | | | | | | |
| $MnO_2$re-1 | $LiMn_2O_4$ | None | 95/0/5 | 2.9 | 21.1 | 200 |
| MnVC-1 | | VGCF | 95/2/3 | | 21.7 | 150 |
| $MnO_2$re-2 | | None | 95/0/5 | 3.3 | 13.2 | 1150 |
| MnVC-2 | | VGCF | 95/2/3 | | 13.8 | 420 |

As is clear from Table 1, when carbon fiber is added to a negative electrode material or positive electrode material, the electrolytic solution permeation rate of the electrode material is significantly improved as compared with the case of a corresponding electrode material containing no carbon fiber. This improvement in electrolytic solution permeability is more considerable in the case of an electrode material having a higher density. Specifically, in the case where MCMB is employed as an active substance, when the density of an electrode material is 1.6 g/cm³, the electrolytic solution permeation time of the electrode material is reduced to 53-80% of that of a corresponding electrode material containing no carbon fiber, whereas when the density of an electrode material is 1.8 g/cm³, the electrolytic solution permeation time of the electrode material is reduced to 20-49% of that of a corresponding electrode material containing no carbon fiber. It is also seen from Table 1 that, in cases of using active substances other than MCMB, the electrolytic solution permeability of an electrode material having a higher density is further improved.

EXAMPLE 2

The electrolytic solution permeability of compositions for solid polymer electrolyte was measured in the same manner as in Example 1. The results are shown in Table 2 together with reference date for comparison.

TABLE 2

Permeation rate of compositions for solid polymer electrolyte in electrode containing carbon fiber

| Composition for solid polymer electrolyte | Active substance | Carbon fiber | Proportions by mass (active substance/ carbon fiber/AB) | Electrode density (g/cm³) | Porosity (%) | Permeation rate (seconds) |
|---|---|---|---|---|---|---|
| | negative electrode | | | | | |
| Composition a-1 | MCMBre-2 | None | 95/0/5 | 1.8 | 13.0 | 1250 |
| Composition a-1 | MCVC2-2 | VGCF | 95/5/0 | 1.8 | 14.7 | 400 |
| Composition b-1 | MCMBre-2 | None | 95/0/5 | 1.8 | 13.0 | 1420 |

TABLE 2-continued

Permeation rate of compositions for solid polymer electrolyte in electrode containing carbon fiber

| Composition for solid polymer electrolyte | Active substance | Carbon fiber | Proportions by mass (active substance/ carbon fiber/AB) | Electrode density (g/cm$^3$) | Porosity (%) | Permeation rate (seconds) |
|---|---|---|---|---|---|---|
| Composition b-1 | MCVC2-2 | VGCF | 95/5/0 | 1.8 | 14.7 | 440 |
| Electrolytic solution (ref.) | MCMBre-2 | None | 95/0/5 | 1.8 | 13.0 | 1050 |
| Electrolytic solution (ref.) | MCVC2-2 | VGCF | 95/5/0 | 1.8 | 14.7 | 210 |
| positive electrode | | | | | | |
| Composition a-1 | CoO$_2$re-2 | None | 95/0/5 | 3.7 | 19.2 | 1900 |
| Composition a-1 | CoVC-2 | VGCF | 95/2/3 | 3.7 | 19.4 | 650 |
| Composition b-1 | CoO$_2$re-2 | None | 95/0/5 | 3.7 | 19.2 | 2200 |
| Composition b-1 | CoVC-2 | VGCF | 95/2/3 | 3.7 | 19.4 | 780 |
| Electrolytic solution (ref.) | CoO$_2$re-2 | None | 95/0/5 | 3.7 | 19.2 | 1250 |
| Electrolytic solution (ref.) | CoVC-2 | VGCF | 95/2/3 | 3.7 | 19.4 | 450 |

As is clear from Table 2, in the electrodes not containing carbon fiber, the electrolytic solution permeation rate of composition for solid polymer electrolyte was outstandingly low as compared with electrolytic solution, while in the electrodes containing carbon fiber, the electrolytic solution permeation rate of composition for solid polymer electrolyte was higher, including the cases of positive electrodes.

EXAMPLE 3

Charging/Discharging Cycle Characteristics of Li Ion Test Cell

A positive electrode and a negative electrode which were prepared in a manner similar to that of Example 1 were employed in combination as shown in Table 3, and cycle characteristics of the resultant cell were evaluated by means of the aforementioned battery evaluation method. The results are shown in Table 3.

TABLE 3

Charging/discharging cycle characteristics of Li ion test cell employing various electrodes (evaluated by the average of two measurement values)

| Positive electrode (density: g/cm$^3$) | Negative electrode (density: g/cm$^3$) | Carbon fiber (amount in positive electrode, amount in negative electrode) | Volume capacity density*[1] (A·h/liter) | Cycle characteristics*[2] |
|---|---|---|---|---|
| CoO$_2$re-1 (3.3) | MCMBre-1 (1.6) | None | 220.0 | 110 |
| CoO$_2$re-2 (3.7) | MCMBre-2 (1.8) | None | 243.3 | 85 |
| CoVC-1 (3.3) | MCVC1-1 (1.6) | VGCF (2%, 2%) | 231.8 | 180 |
| CoVC-2 (3.7) | MCVC1-2 (1.8) | VGCF (2%, 2%) | 260.5 | 170 |
| CoVC-1 (3.3) | MCVC2-1 (1.6) | VGCF (2%, 5%) | 236.8 | 240 |
| CoVC-2 (3.7) | MCVC2-2 (1.8) | VGCF (2%, 5%) | 266.2 | 225 |
| CoO$_2$re-1 (3.3) | SCMGre-1 (1.6) | None | 223.0 | 105 |
| CoO$_2$re-2 (3.8) | SCMGre-2 (1.8) | None | 241.0 | 80 |
| CoVC-1 (3.4) | SCVC1-1 (1.6) | VGCF (2%, 2%) | 233.0 | 205 |
| CoVC-2 (3.8) | MCVC1-2 (1.8) | VGCF (2%, 2%) | 260.5 | 185 |
| MnO$_2$re-1 (2.9) | SCMGre-1 (1.6) | None | 205.6 | 120 |
| MnO$_2$re-2 (3.3) | SCMGre-2 (1.8) | None | 218.3 | 105 |
| MnVC-1 (2.9) | SCVC1-1 (1.6) | VGCF (2%, 2%) | 215.7 | 255 |
| MnVC-2 (3.3) | MCVC1-2 (1.8) | VGCF (2%, 2%) | 235.1 | 232 |

*[1]Cell discharging capacity/(positive electrode volume + negative electrode volume)
*[2]Cycle number at 80% or more of the maximum capacity As is clear from Table 3, as the electrode density is increased, the capacity per electrode volume (volume capacity density) is increased, and cycle characteristics are impaired.

In the case where an electrode containing no carbon fiber is employed, the percent impairment of cycle characteristics is 20 and several percent. In contrast, in the case where an electrode containing carbon fiber; i.e., the electrode of the present invention, is employed, the percent impairment of cycle characteristics is 10% or less.

EXAMPLE 4

Charging/Discharging Cycle Characteristics of Li Ion Polymer Test Cell

A positive electrode and a negative electrode which were prepared in a manner similar to that of Example 3 were employed in combination with compositions for solid polymer electrolyte as shown in Table 4, and cycle characteristics of the resultant cell were evaluated by means of the aforementioned battery evaluation method. The results are shown in Table 4.

TABLE 4

Charging/discharging cycle characteristics of Li ion polymer test cell employing various electrodes (evaluated by the average of two measurement values)

| Composition for solid polymer electrolyte | Positive electrode (density: g/cm³) | Negative electrode (density: g/cm³) | Carbon fiber (amount in positive electrode, amount in negative electrode) | Volume capacity density*1 (A·h/liter) | Cycle characteristics*2 |
|---|---|---|---|---|---|
| Composition a-2 | $CoO_2$(3.7) | MCMB(1.8) | None | 243.3 | 88 |
| Composition a-2 | $CoO_2$(3.7) | MCMB(1.8) | VGCF(2%, 2%) | 260.5 | 201 |
| Composition b-2 | $CoO_2$(3.7) | MCMB(1.8) | None | 243.3 | 92 |
| Composition b-2 | $CoO_2$(3.7) | MCMB(1.8) | VGCF(2%, 2%) | 260.5 | 234 |

*1 Cell discharging capacity/(positive electrode volume + negative electrode volume)
*2 Cycle number at 80% or more of the maximum capacity

INDUSTRIAL APPLICABILITY

The electrode of the present invention contains a large amount of an electrode active substance, and has high density. Therefore, the electrode of the present invention can be employed in a battery of high energy density; i.e., a battery having high capacity per electrode volume.

In general, as the density of an electrode is increased, the amount of pores contained in the electrode is reduced, leading to problems, including shortage of the amount of an electrolytic solution, which is generally present in the pores and plays an important role for electrode reaction, and lowering of the rate of permeation of the electrolytic solution throughout the electrode. As a result, the rate of electrode reaction decreases, energy density is lowered, and high-speed charging/discharging performance is impaired. Meanwhile, the time required for the production of a battery is lengthened, leading to an increase in production cost. However, the high-density electrode of the present invention contains carbon fiber, and therefore, impairment of electrolytic solution permeability is prevented, and electrolytic solution retainability is improved, whereby the above-described problems can be solved.

The invention claimed is:

1. A high-density electrode, obtained by impregnating a high-density electrode which comprises an electrode active substance and carbon fiber having a fiber filament diameter of 1 to 1,000 nm and has a porosity of 25% or less, with a solid polymer electrolyte,
wherein the electrode active substance is a carbon material,
wherein the carbon material contains a graphite material in an amount of 50 mass % or more, and the bulk density of the electrode is 1.7 g/cm³ or more, and
wherein the graphite material is carbon particles containing, in an amount of 50 mass % or more, graphite particles satisfying the following requirements:

(1) $C_0$ of a (002) plane as measured by means of X-ray diffractometry is 0.6900 nm, La (the size of a crystallite as measured along the a-axis) is greater than 100 nm, and Lc (the size of a crystallite as measured along the c-axis) is greater than 100 nm;

(2) BET specific surface area is 0.2 to 5 m²/g;

(3) true density is 2.20 g/cm³ or more; and (4) laser Raman R value (the ratio of the intensity of a peak at 1,360 cm⁻¹ in a laser Raman spectrum to that of a peak at 1,580 cm⁻¹ in the spectrum) is 0.01 to 0.9.

2. The high-density electrode as claimed in claim 1, wherein the carbon fiber is graphite carbon fiber which has undergone thermal treatment at 2,000° C. or higher.

3. The high-density electrode as claimed in claim 1, wherein the carbon fiber is graphite carbon fiber having a surface onto which an oxygen-containing functional group has been introduced through oxidation treatment.

4. The high-density electrode as claimed in claim 1, wherein the carbon fiber is graphite carbon fiber containing boron in an amount of 0.1 to 100,000 ppm.

5. The high-density electrode as claimed in claim 1, wherein the amount of the carbon fiber is 0.05 to 20 mass %.

6. The high-density electrode as claimed in claim 1, wherein the carbon fiber has an average aspect ratio of 5 to 50,000.

7. The high-density electrode as claimed in claim 2, wherein the graphite carbon fiber has, at a (002) plane, an average interlayer distance ($d_{002}$) of 0.344 nm or less as measured by means of X-ray diffractometry.

8. The high-density electrode as claimed in claim 1, wherein the carbon fiber has, in its interior, a hollow structure.

9. The high-density electrode as claimed in claim 1, wherein the carbon fiber contains branched carbon fiber.

10. The high-density electrode as claimed in 1, wherein the carbon material contains Si.

11. The high-density electrode as claimed in claim 1, wherein, before being formed into an electrode, the carbon material serving as the electrode active substance is in the form of carbonaceous particles satisfying the following requirements:

(1) average roundness as measured by use of a flow particle image analyzer is 0.70 to 0.99; and (2) average particle size as measured by means of laser diffractometry is 1 to 50 μm.

12. The high-density electrode as claimed in claim 1, wherein the graphite material contains boron.

13. The high-density electrode as claimed in claim 1, wherein, before being formed into an electrode, the carbon material serving as the electrode active substance is in the form of carbon particles containing, in an amount of 50 mass % or more, graphite particles satisfying the following requirements:

(1) average roundness as measured by use of a flow particle image analyzer is 0.70 to 0.99; and (2) average particle size as measured by means of laser diffractometry is 1 to 50 μm.

14. The high-density electrode as claimed in claim 1, containing a carbon fiber having a filament diameter of 1 to 1,000 nm in an amount of 0.2 to 20 mass %, and having a capacity density of 100 mAh/g or higher.

15. The high-density electrode as claimed in claim 14, wherein the electrode absorbs 3 μl of propylene carbonate within 500 seconds at 25° C. and 1 atm.

16. The high-density electrode as claimed in claim 1, wherein the solid polymer electrolyte comprises at least one compound having as a constituent a unit represented by formula (1) and/or (2):

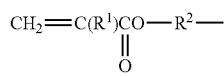
(1)

-continued

(2)

wherein $R^1$ and $R^3$ each represents a hydrogen atom or an alkyl group; $R^2$ and $R^5$ each represents a divalent group containing oxyalkylene group, fluorocarbon group and/or carbonate group; $R^4$ represents a divalent group having 10 or less carbon atoms; $R^2$, $R^4$ and $R^5$ may each include a hetero atom, and may have a linear, branched or cyclic structure; x represents 0 or an integer of 1 to 10; and in a case where two or more of polymerizable functional groups represented by the above formulae are contained in one molecule, $R^1$ to $R^5$ and x in one functional group may be the same with or different from those symbols in the other functional groups.

17. The high-density electrode as claimed in claim 1, wherein a non-aqueous solvent employed for the solid polymer electrolyte contains at least one species selected from the group consisting of ethylene carbonate, diethyl carbonate, dimethyl carbonate, methyl ethyl carbonate, propylene carbonate, butylene carbonate, and vinylene carbonate.

18. A battery comprising a high-density electrode as recited in claim 1.

19. A secondary battery comprising a high-density electrode as recited in claim 1.

* * * * *